United States Patent [19]
Wieglus

[11] Patent Number: 5,988,054
[45] Date of Patent: Nov. 23, 1999

[54] AUTOMATED SYSTEM FOR HANDLING RETURNED DRINK CONTAINERS

[75] Inventor: Richard W. Wieglus, Lewiston, N.Y.

[73] Assignee: Tomra of North America, Inc., Stratford, Conn.

[21] Appl. No.: 09/130,190

[22] Filed: Aug. 4, 1998

[51] Int. Cl.⁶ .................................................. B30B 9/32
[52] U.S. Cl. .................... 100/102; 100/193; 100/215; 100/902; 194/209; 198/363; 198/601
[58] Field of Search ................................. 100/45, 49, 91, 100/102, 137, 193, 215, 902; 194/208, 209; 198/348, 363, 601

[56] References Cited

U.S. PATENT DOCUMENTS

| | | | |
|---|---|---|---|
| 1,425,556 | 8/1922 | Tingwall et al. | 198/363 |
| 1,600,357 | 9/1926 | Peil, Jr. | 198/601 |
| 1,847,263 | 3/1932 | Sandberg | 198/601 |
| 1,907,189 | 5/1933 | Seaman . | |
| 1,943,149 | 1/1934 | Schneider | 198/601 |
| 2,157,642 | 5/1939 | Vosler . | |
| 2,344,664 | 3/1944 | Adams . | |
| 2,578,603 | 12/1951 | Rothman . | |
| 2,801,728 | 8/1957 | Temple | 198/601 |
| 3,212,432 | 10/1965 | Raab | 100/215 |
| 3,269,571 | 8/1966 | McLearn et al. . | |
| 3,371,767 | 3/1968 | Rehr et al. | 198/363 |
| 3,838,634 | 10/1974 | Alexandrov et al. | 100/45 |
| 4,248,389 | 2/1981 | Thompson et al. | 100/91 |
| 4,898,270 | 2/1990 | Hopkins et al. | 198/396 |
| 5,226,519 | 7/1993 | DeWoolfson | 194/209 |
| 5,461,972 | 10/1995 | Tahkanen | 100/137 |
| 5,474,415 | 12/1995 | Becker et al. . | |
| 5,477,953 | 12/1995 | Powell et al. | 194/209 |
| 5,567,105 | 10/1996 | Williams . | |

FOREIGN PATENT DOCUMENTS

| | | | |
|---|---|---|---|
| 1761043 | 9/1992 | Russian Federation | 100/102 |
| 3706 | 2/1892 | United Kingdom | 100/193 |
| 2269774 | 2/1994 | United Kingdom | 100/902 |

*Primary Examiner*—Stephen F. Gerrity
*Attorney, Agent, or Firm*—Harris Beach & Wilcox, LLP.

[57] ABSTRACT

An automated container handling and processing system includes a metal container handling subsystem and a plastic container handling subsystem. Each container subsystem includes a roller conveyor for conveying a plurality of large bins carrying crushed containers derived from reverse vending machines. An automated dumping station receives and inverts the bins sequentially to dump the crushed containers into a central hopper, then sends the bins to a washer which cleans the bins for reuse. A separate belt conveyor receives containers which do not require identification or accounting and conveys them to the central hopper. A second belt conveyor which also leads to the central hopper receives containers from one or more sorting machines which process non-crushed containers from non-RV machine return centers. Each sorting machine is capable of reading a bar code on each container to identify the brand and of providing that information to a central accounting system which keeps track of the number of containers of each brand and credits them to the correct original distributor. The central hopper feeds all containers to a crusher/baler which crushes and bales containers from all three sources.

9 Claims, 6 Drawing Sheets

AUTOMATED SYSTEM FOR HANDLING RETURNED DRINK CONTAINERS

BACKGROUND OF THE INVENTION

1. Field of the Invention

The present invention relates to apparatus for materials handling, more particularly to systems for handling recycled materials, and most particularly to a system for receiving, sorting, counting, identifying, crushing, and packaging returned drink containers.

2. Discussion of the Related Art

In many states today, containers for carbonated soft drinks and beer are assessed a deposit of up to, for example, ten cents each at the time they are purchased for consumption of the contents by a consumer. After such consumption, the consumer may return each container to a return center, for example, a supermarket, and obtain a full refund of the deposit. As used herein, "container" refers to any of various sizes and styles of bottles and cans which may be formed from, for example, glass, plastic such as polyethylene terephthalate (PET), or metal such as aluminum or steel. "Returnable" refers to any container which may be returned to a vendor by a consumer; most returnables also carry a refundable deposit. "Refillable" refers to any returnable container which may be washed, refilled with the same drink product as in its previous use, relabelled, and sold again. Refillables are exclusively glass containers. Most returnables are not refillable but instead are subject to a materials recycling process through which the individual containers are destroyed and the materials such as glass, plastic, and metals from which they were formed are recovered for reuse.

Until fairly recently, the handling of containers returned to a return center has been completely manual. Typically, a clerk receives containers from a customer, checks each container for deposit authenticity, counts the containers and sorts them by material, and refunds the appropriate amount to the customer. The containers are accumulated, typically without being crushed, at the outlet in large bags or bins which are then manually carried to a loading dock and loaded onto a truck which takes them to a central processing station for accounting and destruction. Such a central station may receive containers from a large number of return centers, for example, more than 1000, and must be able to accurately assign credit a large number of distributors, for example, about 100, for the containers it processes, which number may be in the tens of millions per week. At the central processing station, the bags are emptied, the containers are sorted by material of manufacture, and identified and counted by brand name of the contents to provide credit information for the original distributor who must reimburse the vendor for the original deposit. The containers are then crushed to reduce volume, and the crushed containers are packaged as by baling for shipment to a materials storage center or a materials purchaser.

The container handling just described is heavily labor-intensive. Manually-handled bags and boxes of containers can be heavy and cumbersome, and the recycling industry is known for a high incidence of back and muscle strains and consequent lost time and employee dissatisfaction.

More recently, machines have become commercially available which can perform all of the container-receiving and accounting tasks at a return center and in addition can crush the containers. Such machines, known in the trade as "reverse vending" machines (referred to herein as RV machines), can receive a succession of either individual metal cans or plastic bottles, rotate each container to read a bar code identifying the brand, count the containers for each brand and account for their number to the original distributor, and then crush each container. Crushing saves in-process storage space at the return center, but can actually make manual transport work more difficult and hazardous because the bags and boxes can hold several times the number of containers as previously and are now proportionally heavier. For example, a typical bag full of non-crushed aluminum cans may weigh less than ten pounds whereas the same bag full of crushed cans may contain about 630 cans and may weigh about 35 pounds.

Not all return centers are provided with such machines, however, and the cost of a recycling machine may always be prohibitive for smaller stores. Therefore, central processing stations must be able to receive and process both non-crushed and crushed containers.

Thus, there is a need for an automated materials handling system which is capable of receiving a wide range of metal cans and plastic bottles in a range of transport containers, of conveying, sorting, counting, crushing/shredding, and packaging the cans and bottles for shipment without significant manual handling or transport of heavy bags or boxes of containers, and of cleaning and returning transport bins for further service.

It is a principal object of the invention to provide an improved automated handling system for converting whole or crushed metal cans and plastic bottles into processed materials suitable for reuse.

It is a further object of the invention to provide an improved automated handling system for containers which requires little or no manual heavy lifting or carrying of the containers or bins.

It is a still further object of the invention to provide an improved automated handling system for containers which can account for the container item input from a large number of return centers and distributors.

BRIEF DESCRIPTION OF THE INVENTION

Briefly described, an automated container handling and processing system in accordance with the invention includes a metal container handling subsystem and a plastic container handling subsystem.

A metal container subsystem may comprise one or more large bins for carrying crushed and accounted metal containers from RV machines. An automated dumping station receives and inverts bins sequentially to dump the crushed containers into a central hopper, then sends the bins to a washer which cleans the bins for reuse. Preferably, a separate belt conveyor system is provided to receive those metal containers which do not require identification or accounting and to convey them to the central hopper. Preferably, an additional conveyor, which also leads to the central hopper, receives containers from one or more sorting machines which process containers from non-RV machine return centers. Each sorting machine, which may be fed either manually or automatically, is capable of reading a bar code on each container to identify the brand and of providing that information to a central accounting system which keeps track of the number of containers of each brand and credits them to the correct original distributor. The central hopper feeds all containers to a crusher/baler, typically by gravity or conveyor, which crushes and bales containers from all three sources. A magnet ahead of the crusher/baler may be used to separate the occasional steel container from the predominantly aluminum container stream.

Preferably, a substantially identical plastic container subsystem performs the same functions for plastic containers, leading to a separate crusher baler for forming plastic bales.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings in which.

DETAILED DESCRIPTION OF THE INVENTION

Figure 1:
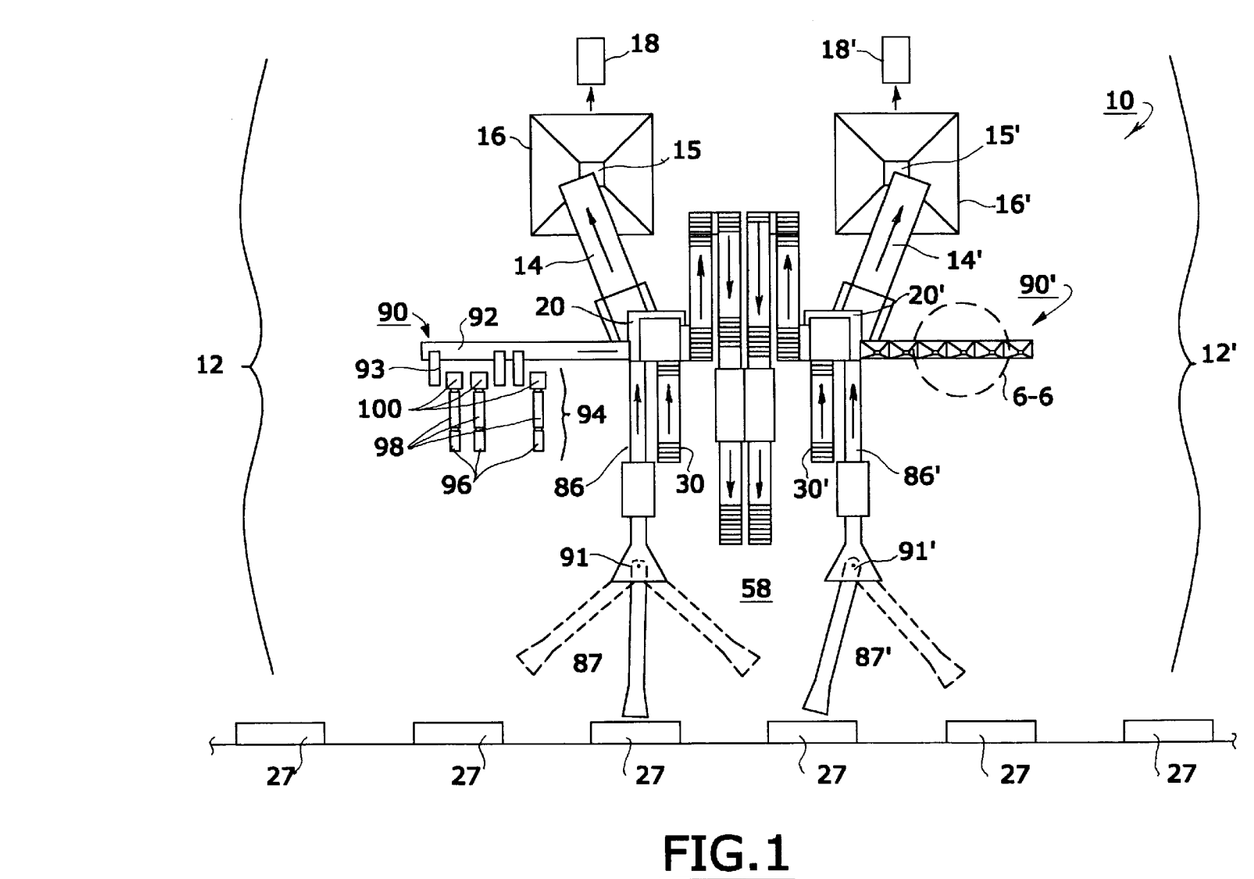
FIG. 1 is a plan view of a materials handling system in accordance with the invention.

Referring to FIG. 1, an automated container handling and processing system 10 for a central container processing station in accordance with the invention includes a metal container handling subsystem 12 and a plastic container handling subsystem 12'. The materials flow scheme and much of the apparatus is common to both subsystems 12 and 12'. For convenience of presentation, those elements which are common to both are designated by number for the metal container subsystem and by number prime for the plastic container subsystem, and the drawings are so numbered as appropriate. For further convenience in understanding, the materials flow path and equipment are presented in substantially the reverse order of flow.

Each system 12,12' supplies, via conveyor means, preferably a conventional belt conveyor 14,14', processed containers, either metal or plastic, to a dedicated container accumulator 15,15' which may be the throat of a crusher/baler 16,16' for crushing the containers, compressing them into a dense bale, binding the bale with wire, and expelling the bale 18,18' for shipment. A suitable crusher/baler, for example, is a Balemaster, Model E-1310, available from Balemaster Corp., Crown Point, Ind., USA. A bale of crushed aluminum cans provided by such a baler can weigh typically about 900–1000 pounds.

Referring to FIGS. 1–5, each subsystem 12,12' includes a central hopper 20,20' having an open top 22,22' for receiving containers and a discharge chute 24,24' for discharging containers onto conveyor 14,14'. Obviously, conveyors 14,14' are employed only for layout convenience in the preferred embodiment 10 shown in FIGS. 1 and 2, since each crusher/baler could be located directly under the appropriate respective hopper 20,20' if so desired. The preferred arrangement shown in FIG. 1 permits all apparatus to be installed on a single floor, for example, a concrete slab, without resort to equipment pits or catwalks.

Each central hopper 20,20' is positioned to receive containers from a plurality of inputs, three such inputs in the preferred embodiment.

At a return center such as a supermarket, a reverse vending machine reads the bar code on each container received and provides the customer with a negotiable receipt for the total containers. The machine then crushes each container and drops it into a receptacle. Crushed containers are received in bins 26 at a central container processing station from return centers having reverse vending machines, which bins preferably are sturdy containers formed from a durable plastic, having a pallet base 28 preferably suitable for movement by fork lift or pallet truck, and being open at the top. A typical bin 26 may be about 48 inches long, 45 inches wide, and 40 inches high, and may weigh about 250 pounds when filled with crushed aluminum cans. Loaded bins 26 are moved onto and off of over-the-road trucks by fork lift or pallet truck and are received at unloading docks 27 of a central container processing station equipped with system 10. No manual lifting or carrying of crushed containers in, for example, bags or boxes, is required. Further, no identification or counting of individual containers is required at the central processing station since the RV machine has already performed those functions. The first input line of system 10 is responsible solely for emptying the bins and sending crushed containers to the baler for baling.

In first input line 30,30', bins 26 are conveyed to hopper 20,20', dumped through the hopper onto conveyor 14,14', washed, and returned for further service. Bins are dumped via an automated bin dumper 32,32' shown in detail in FIGS. 3–5. Overall operation and coordination of elements of dumper 32 is achieved via a programmable logic controller 33,33'. A horizontal conveyor means 34,34', preferably a driven roller conveyor such as a Model Q-50 "lineshaft" conveyor available from Speedways Conveyors, Buffalo, N.Y. USA, receives full bins at input end 36,36' thereof, and conveys the bins to rotary dumping unit 38,38'. Preferably, conveyor 34 and dumping unit 38 are elevated above the floor as shown to permit gravity dumping of crushed containers from the bins into the hopper and gravity return of bins after dumping. Preferably, conveyor 34 is formed of several independently-drivable sections of roller conveyor, each section having a bin sensor, for example, an electric eye (not shown). Each section is preferably about the length of a bin. Controller 33 starts and stops the independent sections of conveyor 34 to advance peristaltically a single full bin or a queue of bins toward dumping unit 38.

Figure 3:
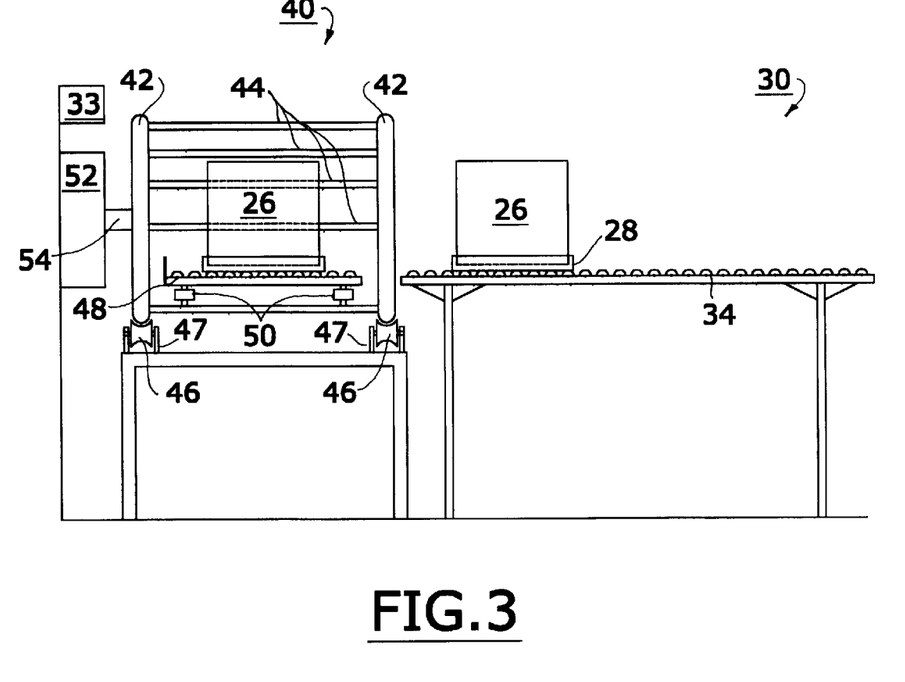
FIG. 3 is an elevational view taken along line 3—3 in FIG. 2.
Figure 4:
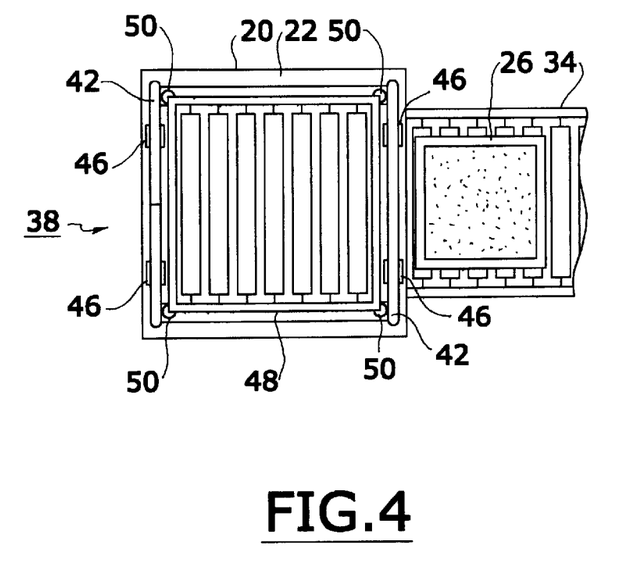
FIG. 4 is a plan view of the bin-dumping portion of the subsystem shown in FIG. 2.
Figure 5A:
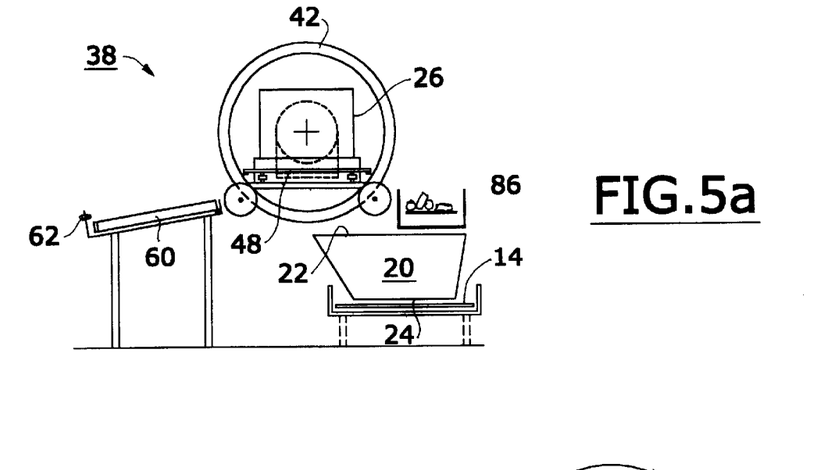
FIGS. 5a, 5b, and 5c are elevational views taken along line 5—5 in FIG. 2, showing three sequential steps in the operation of the dumping subsystem shown in FIG. 2.

Dumping unit 38 comprises a cage-like frame 40 having two circular members or rings 42. These rings are connected, in parallel position, by cross-members 44. The frame is supported by four rollers 46 journalled on bearings 47, the rollers being circumferentially grooved to receive the outwardly projecting flanges of rings 42, as shown in FIG. 3. This arrangement permits the frame to rotate about the axis of the rings. Within frame 40 is disposed a roller conveyor 48 for receiving each individual bin 26, as shown in FIG. 5a. Preferably, conveyor section 48 is mounted on a plurality of load cells 50, preferably four, the load cells communicating with controller 33 such that the gross and tare weights of each bin may be measured as desired to account for the material mass throughput of the apparatus.

Figure 5B:
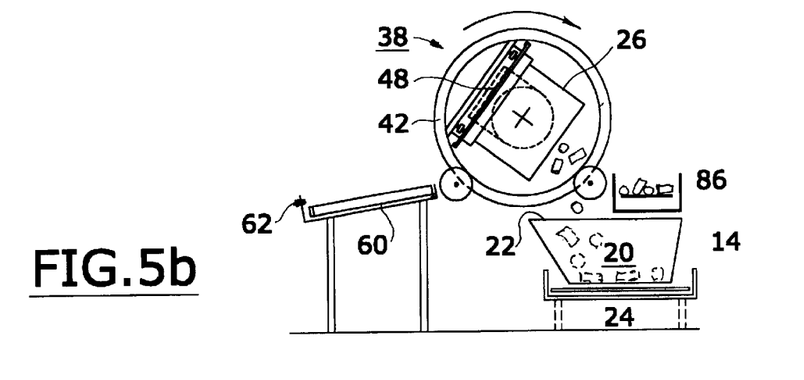

Unit 38 further includes a rotary drive unit 52 operationally connected via shaft 54 to frame 40 for rotation thereof through a predetermined angle from horizontal in a first rotational direction for dumping crushed containers from a bin 26 into hopper 20 on a signal from controller 33, as shown in FIG. 5b.

Figure 2:
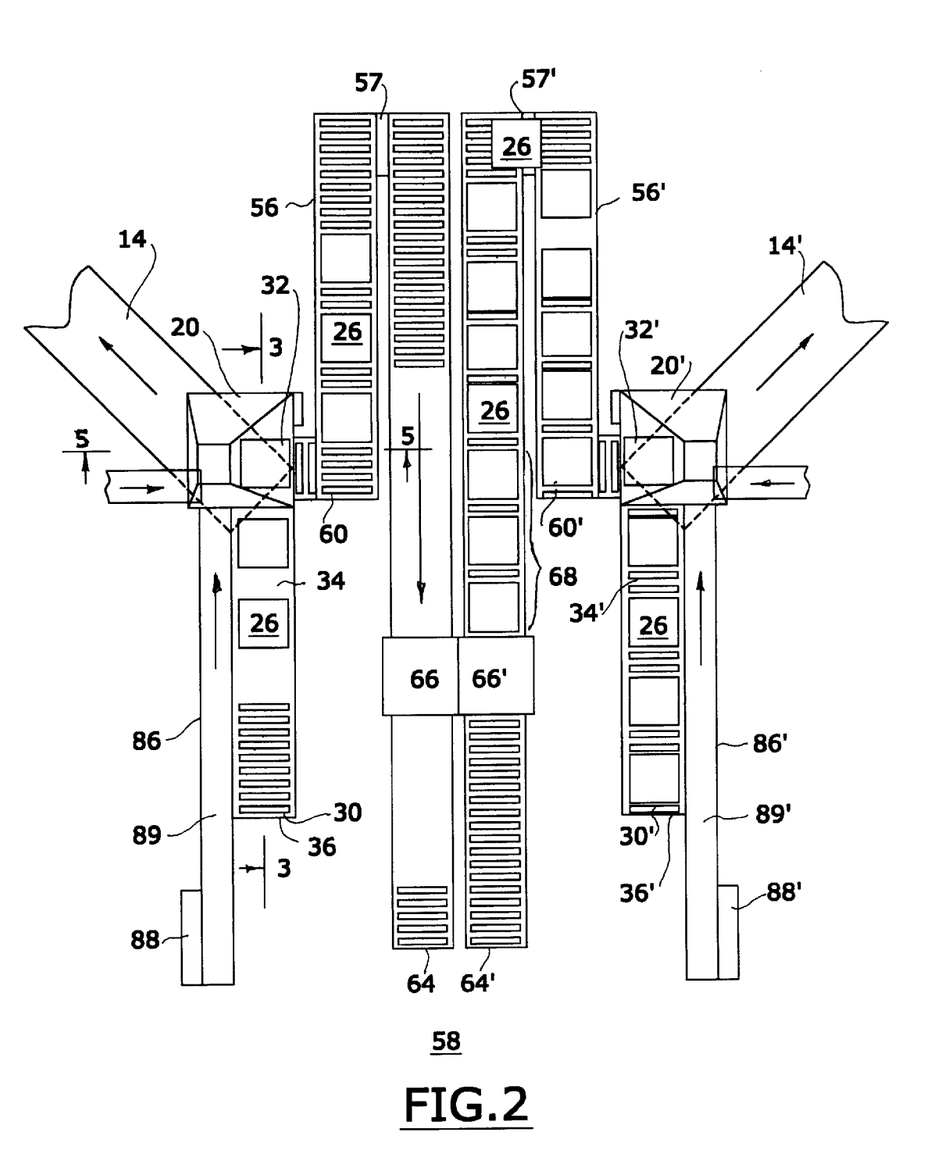
FIG. 2 is a detailed plan view of a central portion of the materials handling system shown in FIG. 1, showing a bin conveying and dumping subsystem in accordance with the invention.
Figure 5C:
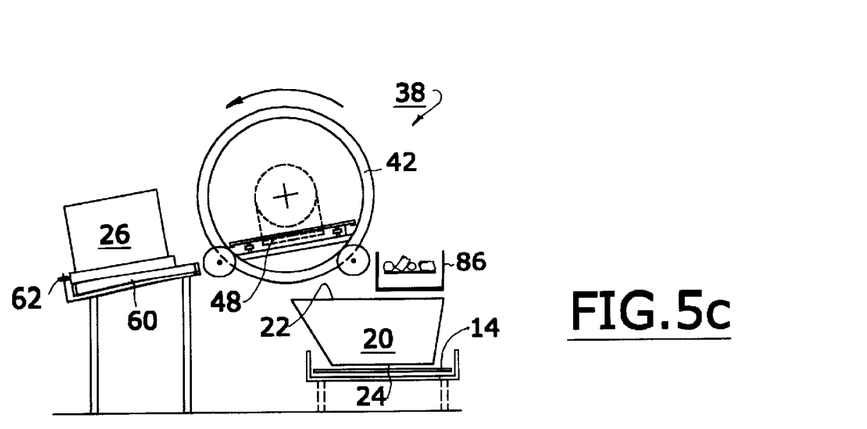

Adjacent to dumping unit 38 is a preferably sloped second conveyor means 56,56', preferably a roller conveyor, for receiving emptied bins and returning them by gravity to a destination which may be marshalling area 58. Conveyor section 56,56' may have a folded path, as shown in FIGS. 1 and 2, which path may include a roller conveyor crossover section 57,57' of conventional design. The initial portion 60, 60' of section 56,56' is mounted lower than, and canted away from, dumping unit 38,38' at an angle of, preferably, about 20 degrees such that dumper conveyor 48,48' is substantially coplanar with portion 60,60' when frame 40,40' is rotated through the equivalent angle in a second rotational direction from horizontal, as shown in FIG. 5c, to cause an emptied bin 26 to be expelled by gravity from dumping unit 38 onto conveyor portion 60,60'. Preferably, conveyor section 56,56' is provided with guide rollers 62 along its lower edge to facilitate conveyance of bins along the conveyor. Preferably, the angle of cant is progressively lessened along the length of conveyor 56,56' such that the conveyor is non-canted at its distal end 64,64'.

Figure 8:
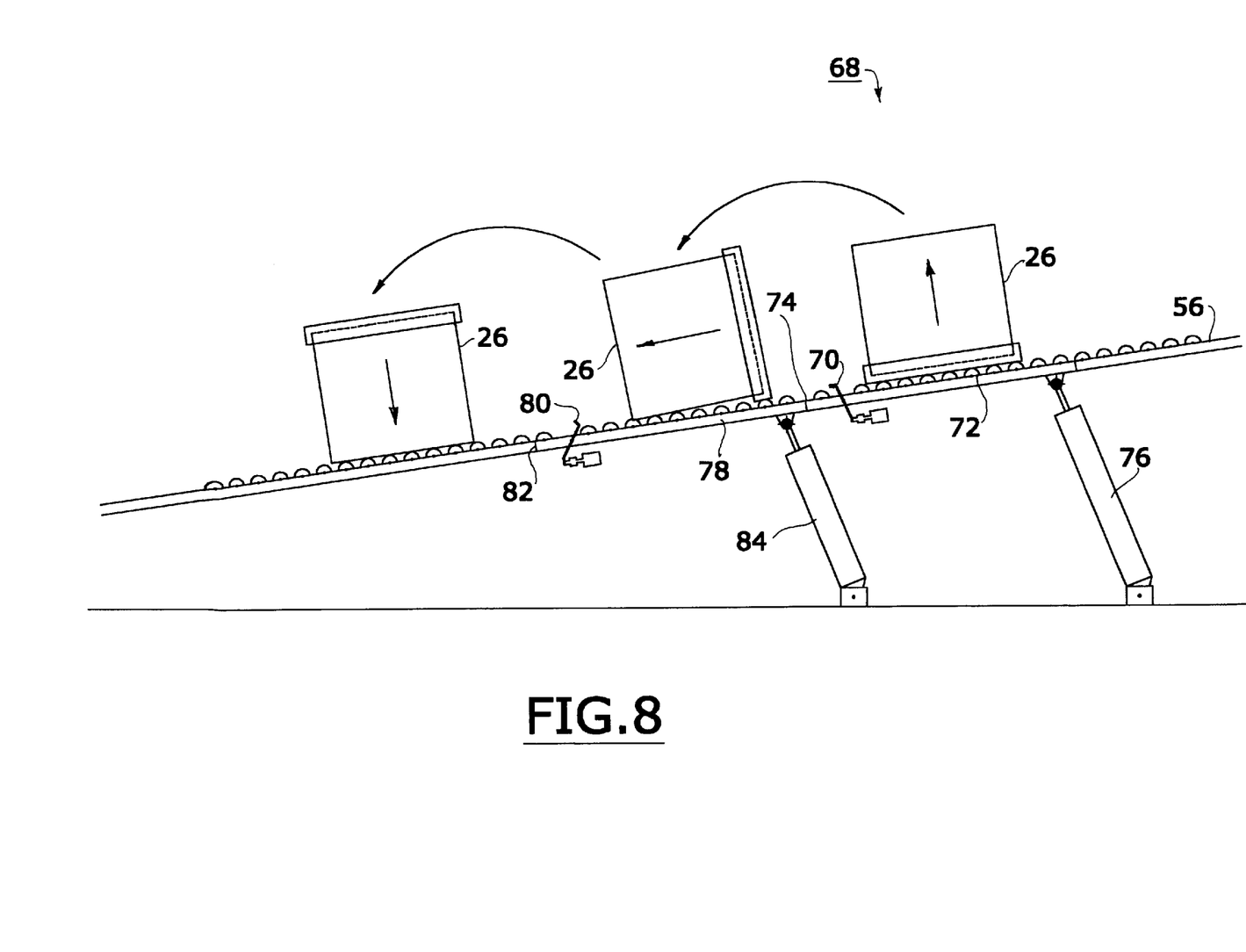
FIG. 8 is an elevational view of a bin inverter in accordance with the invention.

Preferably, section 56,56' is provided with a bin washer 66,66' such that the interior of each bin may be washed automatically as desired prior to the bin being returned to service. Bin washer 66,66' may be a simple and conventional spray-and-flush apparatus in a protective housing and need not be illustrated nor detailed herein. Before entering washer 66,66', each bin is inverted by a bin-inverter 68, as shown in FIG. 8, to position the bin for spray washing from below. Preferably, the sequencing of elements in inverter 68 and bin washer 66,66' is controlled by controller 33. At a first selectable bin stopper 70 in conveyor 56,56', each bin is stopped on a first pivotable portion 72 of conveyor 56,56'. Bin stopper 70 may be raised to intercept a bin to be washed, or may be lowered to pass a bin without washing. Portion 72 is pivoted upwards and forwards around hinge 74 by a first conventional actuator 76, for example, a pneumatic cylinder, to cause the bin to fall forwards onto its side on a second pivotable portion 78 of conveyor 56,56' and to come to rest against a second selectable bin stopper 80. Portion 78 is pivoted upwards and forwards around hinge 82 by a second conventional actuator 84 to cause the bin to fall forwards again onto the upper edges of its sides, completing the inversion of the bin which is thus properly oriented to be washed by washer 66,66'.

Figure 6:
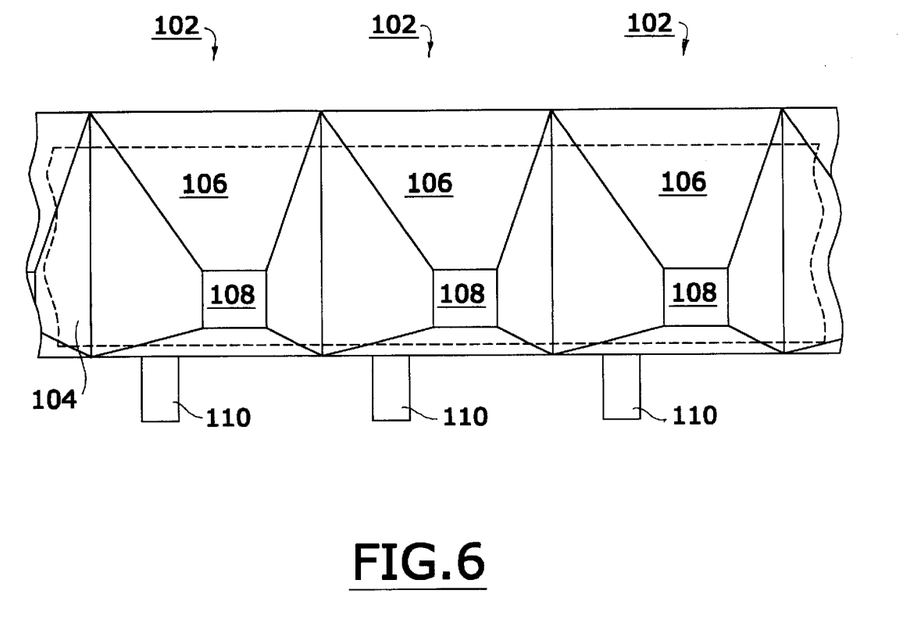
FIG. 6 is a detailed plan view of the area within circle 6 in FIG. 1, showing a portion of a plastic container handling susbsystem in accordance with the invention.
Figure 7:
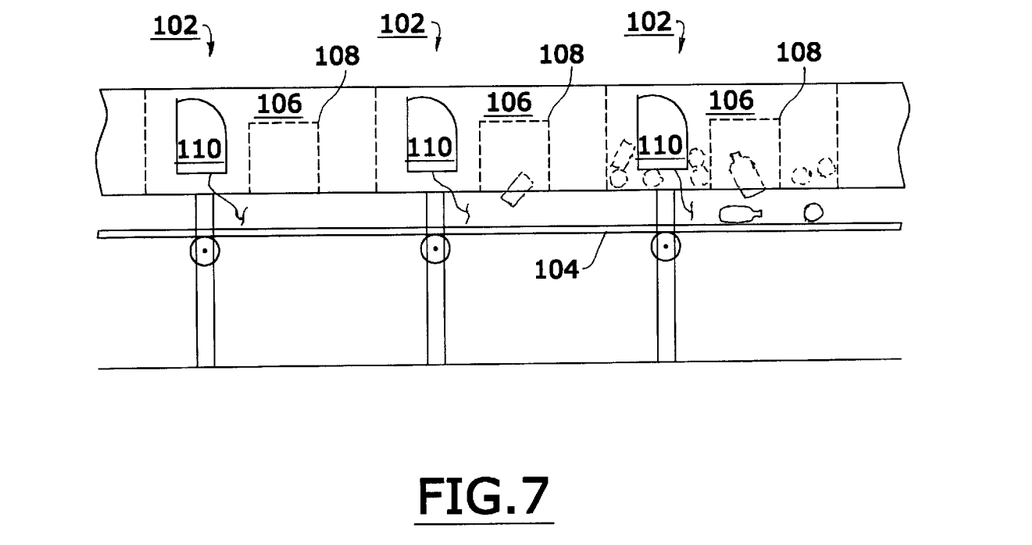
FIG. 7 is an elevational view of the apparatus shown in FIG. 6.

Two different types of second input lines 90 and 90' are shown in FIGS. 1, 6, and 7 to show the input flexibility of which a system in accordance with the invention is capable.

Input line 90 is most useful for processing at high speed a large number of containers which are all of substantially the same size and shape. The carbonated soft drink and beer industries in at least the United States and Canada have agreed on a common container shape and dimensions for nearly all deposit beverages supplied in cans; thus, input line 90 at present is most useful for processing metal drink containers, of which over 99% are formed from aluminum. Input line 90 comprises a conveyor means 92, preferably a conventional belt conveyor, leading to hopper 20. Along conveyor 92 are disposed one or more container processing machines 94, preferably similar to machines disclosed in U.S. Pat. No. 4,898,270 issued Feb. 6, 1990 to Hopkins et al. and hereby incorporated by reference; accordingly, machines 94 are not further illustrated herein. Each machine has a control center wherein the previous container tally may be zeroed and the return center identity of the next batch of containers may be entered and transmitted to a remote CPU (not shown) which has accounting responsibilities for all containers passing through lines 90 and 90'. The machine is capable of identifying correctly any one of a large plurality of return centers, for example, more than 1000. Each machine includes a loading chute 96 for receiving loose, non-crushed metal containers which are fed on a belt conveyor through a multi-channel singulator 98 which aligns the containers axially lengthwise of the conveyor. The containers are fed sequentially onto another, canted, transverse conveyor 100 which moves under a stationary panel such that each container is caused to rotate rapidly about its longitudinal axis (roll) as it passes along the conveyor. A laser bar code reader, preferably a plurality of redundant readers, reads the bar code on each rolling container and transmits the brand name and tally to the accounting CPU. Containers which cannot be singulated or read are diverted for separate manual handling and entry. Each container which is read is released via a machine conveyor 93 to conveyor 92.

Input line 90' is shown in detail in FIGS. 6 and 7. Line 90' is useful for types of containers having a wide variety of shapes and sizes which are not amenable to automatic processing through machine 94 and therefore require manual handling and entry of each container. At present, this describes the plastic beverage bottle, virtually all of which are formed from polyethylene terephthalate.

Line 90' comprises a series of operator work stations 102 along a conveyor means 104, preferably a belt conveyor, leading to hopper 20'. Each work station includes a bin 106 having a chute 108 with a rim raised above the bottom of bin 106 leading to conveyor 104 and a data entry station 110, preferably a bar code reader in communication with the accounting CPU. An operator at each work station 102 dumps small bags or boxes of non-crushed containers into bin 106 for manual sorting. As on line 90, the identity of the return center source is entered. The brand identity of each container is then manually obtained, preferably by exposure to a bar code reader in data entry station 110, after which the container is dropped through chute 108 onto conveyor 104 which conveys it to hopper 20'.

Another class of containers which must be accommodated at a central processing station are non-crushed containers which must be crushed and baled but which require no accounting of brand or number, known in the trade as can and bottle "dumps." These containers may be literally dumped onto either conveyor 92 (metal cans) or conveyor 104 (plastic bottles) to convey them to hopper 20,20'. However, for a high-volume facility it is preferable to have a separate third input line 86,86', as shown in FIGS. 1, 2, and 5. Non-crushed containers may be dumped manually from small bags or boxes into a loading chute 88,88' which discharges the containers onto a conveyor means 89,89', preferably a conventional belt conveyor, leading to hopper 20,20'. Additionally, each input line 86,86' may be provided with a feed conveyor 87,87' of conventional design extending from the unloading docks 27 to the proximal end 91,91' of conveyor 89,89' to facilitate direct dumping of cans and bottles from trucks into line 86,86'. Preferably, feed conveyor 87,87' is pivotable at end 91,91' such that the conveyor can be swung from one dock to another to receive can and bottle dumps from a plurality of unloading docks. Feed conveyor 87,87' may also be mounted in a tunnel under marshalling area 58 to keep that area free for operation of fork lifts and pallet trucks.

From the foregoing description it will be apparent that there has been provided an improved automated container handling system for recycle processing of a wide variety of metal and plastic containers for beer and carbonated soft drinks, including containers which have been previously crushed and accounted, containers which require no accounting but must be crushed, and containers which have been neither accounted nor crushed. Variations and modifications of the herein described automated container handling system, in accordance with the invention, will undoubtedly suggest themselves to those skilled in this art. Accordingly, the foregoing description should be taken as illustrative and not in a limiting sense.

What is claimed is:

1. An automated system for handling returned drink containers, comprising:
   a) an accumulator for accumulating said containers;
   b) first conveyance means for receiving and conveying crushed drink containers to said accumulator;
   b) second conveyance means for receiving and conveying non-crushed drink containers to said accumulator, including means for determining the brand of each container and for tallying the number of containers conveyed; and
   c) third conveyance means for receiving and conveying non-crushed drink containers to said accumulator.

2. An automated system in accordance with claim 1 further comprising a crusher/baler for crushing and baling said accumulated containers.

3. An automated system in accordance with claim 1 further comprising a hopper common to said first, second, and third conveyance apparatus and a common conveyor from said common hopper to said accumulator.

4. An automated system in accordance with claim 3 wherein said first conveyance apparatus comprises:
   a) at least one portable bin for carrying said crushed containers;
   b) input conveyor means for conveying said bin;
   c) a dumping station for receiving from said input conveyor means said bin when carrying said crushed containers and for rotating said bin to dump said crushed containers into said hopper; and
   d) output conveyor means for receiving said emptied bin from said dumping station and for conveying said emptied bin to a destination.

5. An automated system in accordance with claim 4 further comprising:
   a) bin-inverting apparatus in said output conveyor means for causing said bin to become inverted; and
   b) a bin washer in said output conveyor means for washing the interior of said bin.

6. An automated system in accordance with claim 1 wherein said means for determining the brand of each container and for tallying the number of containers conveyed comprises a container-processing machine having:
   a) means for aligning said containers axially;
   b) means for reading bar codes on the surfaces of said aligned containers; and
   c) means for rotating said aligned containers to present said bar codes to said reading means.

7. An automated system in accordance with claim 6 further comprising a plurality of said container-processing machines.

8. An automated system for handling returned drink containers formed from metal and plastic, comprising:
   a) a metal accumulator;
   b) a plastic accumulator;
   c) first metal conveyance means for receiving and conveying crushed metal drink containers to said metal accumulator;
   d) first plastic conveyance means for receiving and conveying crushed plastic drink containers to said plastic accumulator;
   e) second metal conveyance means for receiving and conveying non-crushed metal drink containers to said metal accumulator, including means for determining the brand of each of said metal containers and for tallying the number of metal containers conveyed;
   f) second plastic conveyance means for receiving and conveying non-crushed plastic drink containers to said plastic accumulator, including means for determining the brand of each of said plastic containers and for tallying the number of plastic containers conveyed;
   g) third metal conveyance means for receiving and conveying non-crushed metal drink containers to said metal accumulator; and
   h) third plastic conveyance means for receiving and conveying non-crushed plastic drink containers to said plastic accumulator.

9. An automated system in accordance with claim 8 further comprising:
   a) a first crusher/baler for crushing and baling said accumulated metal containers; and
   b) a second crusher/baler for crushing and baling said accumulated plastic containers.

* * * * *